United States Patent [19]

Prasniewski

[11] 3,806,151

[45] Apr. 23, 1974

[54] SPRING SUSPENSION SYSTEM FOR VEHICLE

[75] Inventor: Jerzy Prasniewski, Downey, Calif.

[73] Assignee: Cambria Spring Company, Los Angeles, Calif.

[22] Filed: Aug. 28, 1972

[21] Appl. No.: 284,156

[52] U.S. Cl. .............................. 280/124 A, 267/52
[51] Int. Cl. ............................................. B60g 3/04
[58] Field of Search....... 280/124 R, 124 A; 267/52, 267/54 R

[56] References Cited
UNITED STATES PATENTS

| | | | |
|---|---|---|---|
| 2,123,305 | 7/1938 | Hierta | 280/124 A |
| 1,774,198 | 8/1930 | Drumm | 267/52 |
| 1,022,193 | 4/1912 | Woodward | 267/52 |

*Primary Examiner*—Philip Goodman
*Assistant Examiner*—John A. Carroll
*Attorney, Agent, or Firm*—Forrest J. Lilly

[57] ABSTRACT

The suspension system is of the independent wheel support type incorporating what is known as the twin I-beam construction which is normally applied to front wheels but may be readily applied to rear wheels. An elongate fore and aft frame carries a cross member to which the suspension members are attached. A first axle member is pivoted to an end of the cross member and extends across and beyond the frame to carry a wheel at its free end. A second axle member is pivoted to the other end of the cross member and extends across in the opposite direction close to and generally parallel to the first one. Primary spring means bear down on the axle members near their free ends to take the normal load. An upwardly convex arched leaf spring is provided to take overloads and is located generally parallel to the axle members above them and beneath the cross member. The mid-point of the spring contacts and bears up against the cross member, and each end contacts and bears down against one of the axle members adjacent to their connections to the primary spring means. The auxiliary spring does not interfere with the normal action of the primary spring means.

5 Claims, 4 Drawing Figures

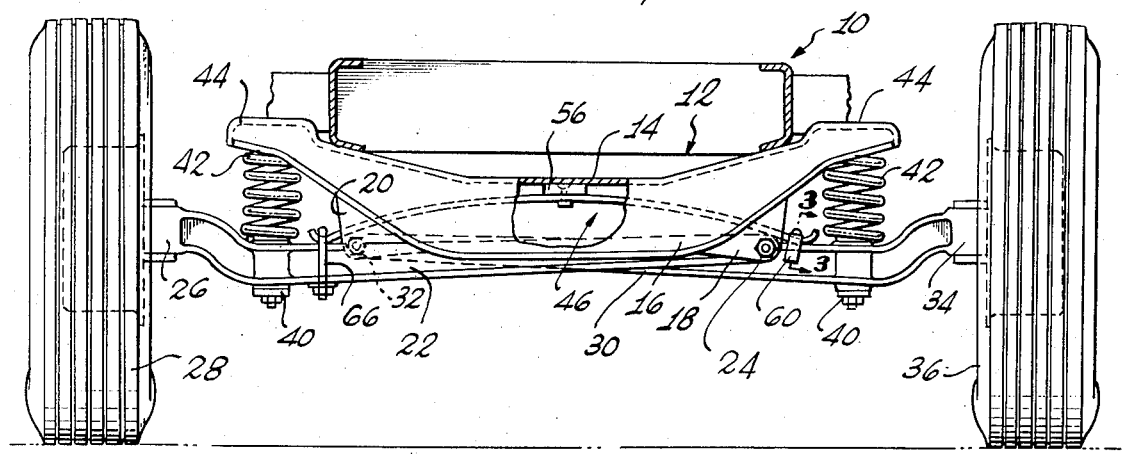
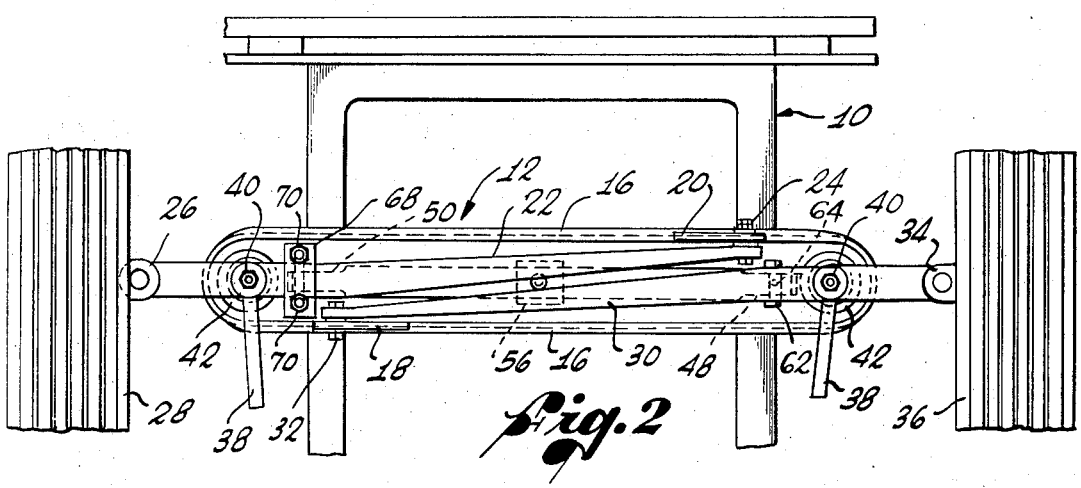
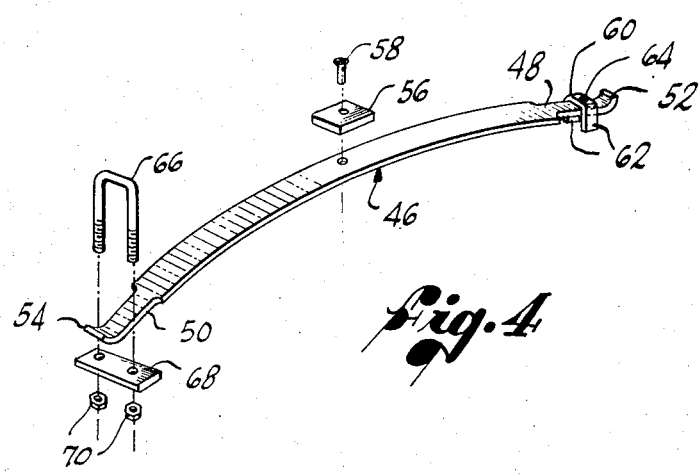
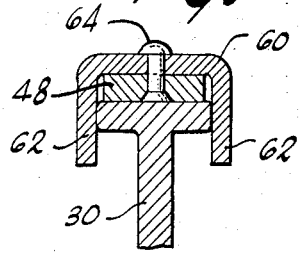

SPRING SUSPENSION SYSTEM FOR VEHICLE

BACKGROUND OF THE INVENTION

This invention lies in the field of automotive vehicles and is directed to spring suspensions for the road wheels of such vehicles, which may be trucks or passenger cars. It is directed particularly to such vehicles in which the wheels are individually sprung.

For many years the standard mounting for the road wheels of automotive vehicles consisted of a single rigid axle extending transversely of the vehicle with a wheel mounted for rotation at each end. The axle was connected to the vehicle frame by a transverse leaf spring connected at each end to the axle and connected at a mid-point to the frame, or by fore and aft leaf springs connected to the frame and to spaced points on the axle. While these suspension systems were durable and adequate they made for rather hard riding.

Independent wheel mounting was introduced to provide softer and smoother riding. With individual springing, one wheel could encounter a substantial bump without disturbing the opposite wheel and with a greatly reduced tendency to tilt the vehicle about a lateral axis. In most cases, such mounting includes upper and lower generally parallel arms pivotally mounted at each side of the vehicle frame for swinging about fore and aft horizontal axes, the outer free ends being pivotally connected to a stub axle carrying a wheel. The load is carried from these arms to the frame by means of coil or torsion springs.

This type of mounting is very satisfactory in general and is widely used at the present time, particularly on passenger vehicles. It has been adopted for the lighter capacity trucks such as small vans, pickups modified as recreational vehicles, and pickups used in place of passenger cars. Both the torsion and the coil springs produce a "soft" ride because of their relatively large deflection in response to a given increment of load. Because of this characteristic they operate satisfactorily only within a comparatively narrow range of loads and are easily overloaded.

In standard passenger cars the springs are simply designed to handle the normal "full load" because only slight overloads can normally be packed into the vehicle. While slight adjustments can be made to change the "standing height" there is no effective way to increase the spring rate except by removal and substitution of heavier springs, which is difficult and expensive. Hence, passenger car suspensions are ordinarily used "as is" with their original production configuration.

Truck type vehicles, on the other hand, are often considerably overloaded. This may be only in the rear because of excess loads carried in the cargo section, or it may be front and rear when a heavy camper body extending over the truck cab is installed. Many different types of helper or auxiliary overload springs have been produced to add to the load carrying capacity of the primary springs. This is particularly important for the front end because when the excess load lowers the "standing height" it changes the steerable wheel geometry in addition to reducing the remaining "bottoming" distance. One of the auxiliary springs used to improve this situation comprises a single or multiple leaf spring in the form of an upwardly convex arch having a mid-point which contacts the underside of a forward frame cross member carrying the wheel supporting arms, the ends of the spring underlying and secured to the lower supporting arms at each side. The initial shape is such that a desired bending load is generated when the spring ends are secured to the arms so that the standing height will be normal with the overload. When the vehicle is driven, the total spring resistance to road shock is substantially increased.

In recent years another type of road wheel suspension has been introduced which may be applied to front or rear wheels but is usually used only at the front end. In this type a pair of elongate axle members are used, usually of the I-beam type. Each axle has a first end pivotally connected near the end of the forward frame cross member and extends across the frame to the far side to support a road wheel for rotation. A torsion or coil spring is connected between the frame and an outer part of the respective axle member to take the road shocks. The major portion of the lengths of the two axle members are coextensive and lie close together in substantial parallelism beneath the cross member. Because of this configuration and the fact that the axle members swing up and down independently, the previous type of auxiliary spring cannot be used. It cannot contact the cross member because of interference by the axle members, and it cannot operate properly if its mid-point contacts the undersides of the axle members because they move independently.

SUMMARY OF THE INVENTION

The present invention overcomes the difficulties mentioned above and provides a simple and inexpensive construction for applying the helper spring principle to the I-beam type of suspension.

Generally stated, and in presently preferred form, the device of the invention comprises an elongate auxiliary leaf spring in the form of an upwardly convex arch which is inserted endwise into the space above the coextensive portions of the axle members and beneath the cross member. An open U-shaped clip having depending side flanges is fixedly secured to a first end of the auxiliary spring. The first end is then moved into the vertically open space between the cross member and the axle members and arranged so that the flanges of the clip will embrace the sides of the axle member which extends from its adjacent pivot to the far side of the vehicle. The spring end then slides along the axle member until the spring is centered under the longitudinal axis of the frame. The spring is then raised until its mid-point contacts the cross member and its second end is set over the adjacent portion of the second axle member. A U-bolt is then applied to secure the second end of the spring to the second axle member.

A block or pad of elastomeric material is secured to the upper side of the mid-point of the spring to contact the underside of the cross member and assist in resiliently maintaining the spring in proper position. Blocks of different thickness may be used to produce the desired initial spring force. If higher spring rates are required for various installations, additional leaves may be added. The long lever arms of the spring and the axle members reduce the relative axial movement between them to a minimum, and this is taken care of by the sliding connection at the clip end of the spring and the resilient connection at its mid-point.

BRIEF DESCRIPTION OF THE DRAWING

Various other advantages and features of novelty will become apparent as the description proceeds in conjunction with the accompanying drawing, in which:

FIG. 1 is a schematic view in front elevation of a vehicle spring suspension incorporating the invention;

FIG. 2 is a schematic bottom plan view of the suspension of FIG. 1;

FIG. 3 is a sectional view taken on line 3—3 of FIG. 1; and

FIG. 4 is an exploded perspective view of the auxiliary spring and its accessory parts.

DESCRIPTION OF PREFERRED EMBODIMENTS

A twin I-beam type of suspension with the auxiliary spring in operative position is schematically illustrated in FIGS. 1 and 2, in which an elongate vehicle main frame 10 is provided near its forward end with a transversely extending elongate suspension cross member 12 having a generally horizontal web 14 and depending side flanges 16 extending longitudinally across the frame. A portion of the forward flange depends downwardly to define a first support bracket 18 and a portion of the aft flange depends downwardly to define a second support bracket 20, both brackets being adjacent to the transversely opposite ends of the cross member.

A first load supporting axle member 22 is pivotally connected at its first end to bracket 18 at 24 for swinging about a horizontal axis generally parallel to the longitudinal axis of frame 10 and it extends across the major portion of the width of the vehicle. At its second, free, end it is provided with a knuckle 26 to receive the king pin of a stub axle supporting wheel 28 for rotation. The second load supporting axle member 30 is similarly pivotally connected at its first end to bracket 20 at 32 for swinging about a horizontal axis generally parallel to the longitudinal axis of frame 10 and it extends across the major portion of the width of the vehicle in the direction opposite to the direction of the first axle member. At its second, free, and it is similarly provided with a knuckle 34 to receive the king pin of a stub axle supporting the second wheel 36 for rotation. Brace rods 38 are connected to intermediate points on the frame and to the axle members at 40 to resist twisting and fore and aft shock loads on the axle members while permitting them to swing up and down.

It will be seen that the mountings of the two wheels are independent so that a road shock on one wheel does not affect the other, which greatly improves handling of the vehicle. The vehicle load may be resisted by torsion type primary springs in well known manner but the suspension is shown in preferred form with coil type primary springs 42. Each end of cross member 12 is formed with a flanged spring pad 44 to receive the upper ends of springs 42, and their lower ends are connected to the upper sides of the axle members adjacent to their free ends. Thus, the weight of the vehicle applies a compression force to primary springs 42 which force is transmitted to axle members 22 and 30 to sustain the normal design load.

As best indicated in FIG. 2, the major portions of the lengths of the two axle members are coextensive and they lie in closely spaced parallelism between the fore and aft flanges 16. In addition, the coextensive portions are arranged at a slight angle to the longitudinal axis of the cross member, while their outer end portions are parallel to such axis. Thus, the free ends are coaxial for symmetry of mounting, while the angled portions overlap lengthwise without interfering with each other. It is apparent that the prior art type of helper spring cannot be applied to this configuration because the midportion of the spring cannot contact the cross member. If it were attempted to mount such helper spring with its mid-point in contact with the lower sides of the axle members, it would be entirely unworkable because the axle members swing independently and would constantly apply twisting forces to the spring. Moreover, the action of one axle member would cause interference with the action of the other.

To overcome this difficulty, auxiliary spring 46 is provided. As shown in FIG. 4, the spring is slender and elongate and is in the form of an upwardly convex arch. The ends 48 and 50 are necked down and provided with bent up tips 52 and 54. A block or pad 56 of elastomeric material is fixedly secured to the upper side of the mid-point of the spring by a rivet 58. A U-shaped clip 60 having depending side flanges 62 is fixedly secured to spring end 48 by a rivet 64, the side flanges being adapted to slidingly embrace the sides of an axle member 30 as illustrated in FIG. 3. A U-bolt 66, wide enough to span the other axle member 22, cross bar 68, and nuts 70 are provided to secure spring end 50 in place.

With clip 60 and pad 56 secured in place, spring end 48 is moved endwise into the vertical space between the cross member web 14 and the axle members, inserting it from the right side as viewed in FIG. 2. Flanges 62 of clip 60 embrace the sides of axle member 30 to guide spring end 48 along the top of the axle member until pad 56 is centered at the longitudinal axis of the frame. Spring end 50 is then set on top of axle member 22 and the U-bolt 66 is placed over spring end 50, and cross bar 68 and nuts 70 are applied to lock end 50 firmly in place. The operation is facilitated by jacking up the vehicle so that the axle members will swing down to substantially the maximum extent. The length of spring 46 is selected so that its ends will be about one half inch inward from primary springs 42.

As indicated in FIG. 2, the fore and aft spacing between the axle members is substantially less than the width of spring 46 so that it could not possibly be secured to the undersides of the axle members and still contact the cross member. Moreover, the angled direction of the axle members would preclude such operation in any event.

The lever arms of both the auxiliary spring and the axle members are quite long and thus there will be very little relative axial movement between spring end 48 and its respective axle member. However, its free mounting does permit such slight movement while flanges 62 of clips 60 prevent lateral displacement of the spring end from the axle member by their engagement with its sides. The elastomeric pad 56 holds the mid-point of spring 46 substantially stationary in contact with web 14 but resiliently permits slight lateral movement. If the vertical spacing between web 14 and the axle members is slightly greater in some cases, a thicker pad may be used. This can also be done to increase the initial spring force of the installation without modifying the spring itself. A higher spring rate may be achieved by adding one or more leaves to the basic spring.

We claim:

1. A suspension system for the road wheels of an automotive vehicle having an elongate frame, comprising:

an elongate rigid cross member extending transversely of the vehicle and attached to the vehicle frame;

first and second support brackets extending downward from the cross member at locations adjacent to the transversely opposite ends thereof;

a first load supporting axle member pivotally connected at its first end to the first bracket for swinging about a horizontal axis generally parallel to the longitudinal axis of the vehicle frame and extending across the major portion of the width of the vehicle and having means at its second, free, end to support a road wheel for rotation;

a second load supporting axle member pivotally connected at its first end to the second bracket for swinging about a horizontal axis generally parallel to the longitudinal axis of the vehicle frame and extending across the major portion of the width of the vehicle and having means at its second, free, end to support a road wheel for rotation;

the major portions of the lengths of the two axle members being longitudinally coextensive and lying in closely spaced generally parallel relation to each other beneath the cross member;

primary spring means attached to the vehicle and bearing down on each axle member adjacent to its free end to support the normal design load of the vehicle;

and an auxiliary overload leaf spring arranged transversely of the vehicle frame beneath the cross member and above the axle members;

the ends of the auxiliary spring bearing down, one on the free end of one of the axle members and the other on the free end of the other axle member, and the mid-portion of the spring bearing up against the cross member to increase the total load capacity of the vehicle.

2. A suspension system as claimed in claim 1; wherein the cross member includes an upper web and spaced depending side flanges extending transversely of the vehicle frame;

the axle members being arranged between the flanges;

and the auxiliary spring being arranged between the flanges with its mid-portion contacting the web.

3. A suspension system as claimed in claim 1; wherein the ends of the auxiliary spring contact the upper surfaces of the axle members inward of and adjacent to the connections of the primary spring means to the axle members.

4. A suspension system as claimed in claim 1; wherein the auxiliary spring is in the form of an upwardly convex arch and an elastomeric pad is fixedly secured to its upper side at its mid-point to contact the cross member.

5. A suspension system as claimed in claim 1; wherein the coextensive portions of the axle members extend at a slight angle to the longitudinal axis of the transverse cross member;

and the fore and aft spacing between the coextensive portions is substantially less than the width of the auxiliary spring.

* * * * *